US009265246B2

(12) United States Patent
Thomas et al.

(10) Patent No.: US 9,265,246 B2
(45) Date of Patent: Feb. 23, 2016

(54) ANIMATED DUCK DECOY

(71) Applicants: Vincent Thomas, Morganfield, KY (US); Frank Eiter, Morganfield, KY (US)

(72) Inventors: Vincent Thomas, Morganfield, KY (US); Frank Eiter, Morganfield, KY (US)

(*) Notice: Subject to any disclaimer, the term of this patent is extended or adjusted under 35 U.S.C. 154(b) by 105 days.

(21) Appl. No.: 14/180,746

(22) Filed: Feb. 14, 2014

(65) Prior Publication Data
US 2015/0230452 A1 Aug. 20, 2015

(51) Int. Cl.
*A01M 31/06* (2006.01)

(52) U.S. Cl.
CPC ..................... *A01M 31/06* (2013.01)

(58) Field of Classification Search
CPC ........................................... A01M 31/06
USPC ............................................... 43/2, 3
See application file for complete search history.

(56) References Cited

U.S. PATENT DOCUMENTS

| | | | | |
|---|---|---|---|---|
| 2,480,390 A * | 8/1949 | Thompson | | 43/3 |
| 2,704,416 A * | 3/1955 | Laird | | 446/158 |
| 2,814,146 A * | 11/1957 | Propp | | 43/3 |
| 2,953,869 A * | 9/1960 | Fritz | | 446/191 |
| 4,845,873 A * | 7/1989 | Hazlett | | A01M 31/06 43/3 |
| 5,377,439 A * | 1/1995 | Roos et al. | | 43/3 |
| 5,775,022 A * | 7/1998 | Sumrall et al. | | 43/3 |
| 6,339,893 B1 * | 1/2002 | Solomon | | 43/3 |
| 6,553,709 B1 * | 4/2003 | Owen | | 43/3 |
| 6,665,975 B2 * | 12/2003 | Porter | | 43/3 |
| 6,708,440 B2 * | 3/2004 | Summers et al. | | 43/2 |
| 7,627,977 B2 * | 12/2009 | Denny | | 43/2 |
| 7,694,451 B1 * | 4/2010 | Zink, Jr. | | 43/3 |

* cited by examiner

*Primary Examiner* — David Parsley
(74) *Attorney, Agent, or Firm* — Gary K. Price (57) ABSTRACT

An animated duck decoy including a decoy base, and a shell removably connected to the base. The shell defining a chamber. An upper bracket attached to an upper surface of the chamber, a tail member connected to an end of a horizontal rod that outwardly extends from a rear of the shell, and an opposite end of the rod connected to a torsion spring, the torsion spring also connected to the upper bracket, the rod further defining an open end. A lower bracket attached to a top surface of the base. The lower bracket having a motor attached thereto, the motor having a drive shaft extending vertically upward from the lower bracket, and the drive shaft having a hub fixed at the top end thereof. The hub having a horizontal arm including a first elastomeric bumper affixed at one end. The horizontal arm is spaced from the lower bracket such that the horizontal arm and the horizontal rod are substantially co-planar, so when the motor rotates the arm in a circular direction, the first bumper strikes the free end of the horizontal rod causing the horizontal rod to rotate horizontally and thus causing the tail member to rotate horizontally.

20 Claims, 6 Drawing Sheets

ANIMATED DUCK DECOY

CROSS REFERENCES TO RELATED APPLICATIONS

U.S. Provisional Application for Patent No. 61/850,501, filed Feb. 15, 2013, with title "Animated Duck Decoy" which is hereby incorporated by reference. Applicant claims priority pursuant to 35 U.S.C. Par. 119(e)(i).

STATEMENT AS TO RIGHTS TO INVENTIONS MADE UNDER FEDERAL SPONSORED RESEARCH AND DEVELOPMENT

Not Applicable.

BACKGROUND OF THE INVENTION

1. Field of the Invention

The present invention generally relates to duck decoys and, more specifically, to an animated duck decoy that closely resembles the appearance and movements of real ducks.

2. Brief Description of Prior Art

Decoys have long been used by hunters to attract ducks. In fact, the use of decoys to attract water fowl is an ancient practice. Typically, prior art decoys float on the surface of a body of water. A relatively recent development in the art of duck decoys has been to provide some means for moving all or part of the decoy, the objective to provide a decoy which appears more natural to water fowl such as ducks or geese. Duck decoys which are colored more like real ducks and with surfaces textured to resembled feathers are common in modern times. Also, as mentioned, attempts have been made to develop decoys with motorized movements which closely resemble the natural movements of a duck, however, such attempts have mostly fallen short.

Some examples of animated decoys have included pendulum motion to stimulate a moving tail, which understandably proved to be unlike the real thing. Others have employed an electrical solenoid to cause motion. Solenoids tend to be noisy and jerky due to the fast pull of the magnetic coil within the solenoids. Still others include noisy mechanisms to stimulate movement wherein the noise scares the animals away rather than attracting them.

As can be seen, there is a continued need for a duck decoy that closely resembles the natural movements of a duck.

SUMMARY OF THE INVENTION

An animated duck decoy having a hollow duck body shell that defines an interior chamber, a floatable base, a tail, and a tail wagging mechanism. The tail wagging mechanism generally includes an upper mechanical portion and a lower mechanical portion.

The upper mechanical portion includes an upper bracket that is attached to an upper surface of the interior chamber. The tail is connected to one end of a generally horizontal rod while the opposite end of the rod is connected to and supported by a torsion spring, and further includes an open end. The torsion spring encircles a pivot post that downwardly extends from the upper bracket, and is connected to the rod and the upper bracket. The rod, and the open end are downwardly spaced a distance from the upper surface of the interior chamber so that the upper mechanical portion is in communications with the lower mechanical portion.

The lower mechanical portion includes a lower bracket attached to a top surface of the floatable base. A rotating arm is connected to a hub which is, in turn, axially connected to a drive shaft that is driven by a motor. The rotating arm includes an elastomeric bumper. The motor causes the rotating arm to rotate in either a clockwise or counterclockwise direction in a horizontal plane. The rotating arm, and the elastomeric bumper, are upwardly spaced a distance from the lower bracket so that the elastomeric bumper is in communication with the upper mechanical portion, such that as the rotating arm rotates on the horizontal plane, the elastomeric bumper strikes the open end of rod, causing the rod and thus the tail to rotate through a horizontal arc as well.

In application, when the motorized rotating arm contacts the horizontal rod at the open end causing it to displace along a selected distance of the horizontal arc, this displacement subjects the torsion spring to sideways forces accumulating potential energy. At the point of disengagement, the rod including the tail comes under the authority of the torsion spring which has been displaced from a neutral position and follows the return motion of the spring. The rod and tail once struck resonances with multiple flicking movements of decreasing horizontal arc distance until it comes to a rest.

These and other features, aspects and advantages of the present invention will become better understood with references to the following drawings, description and claims.

DESCRIPTION OF THE PREFERRED EMBODIMENT

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The animated duck decoy of the present invention is directed to a duck decoy which mimics animal movement. More particularly, the animated duck decoy of the present invention includes a decoy body that resembles a real duck and includes a tail wagging mechanism. As will be discussed, the animated duck decoy as disclosed consists of components configured and correlated with respect to each other so as to attain the desired objective.

In accordance with the present invention, there is provided a duck decoy 10 which includes a tail wagging mechanism generally designated as numeral 20. The duck decoy 10 comprises a hollow duck body shell 12 that defines an interior chamber 13, a floatable base 40, a tail 16, and the tail wagging mechanism means 20.

The tail wagging mechanism of the present invention generally includes an upper mechanical portion and a lower mechanical portion, working together to achieve the desired results.

Upper Mechanical Portion

Figure 1:
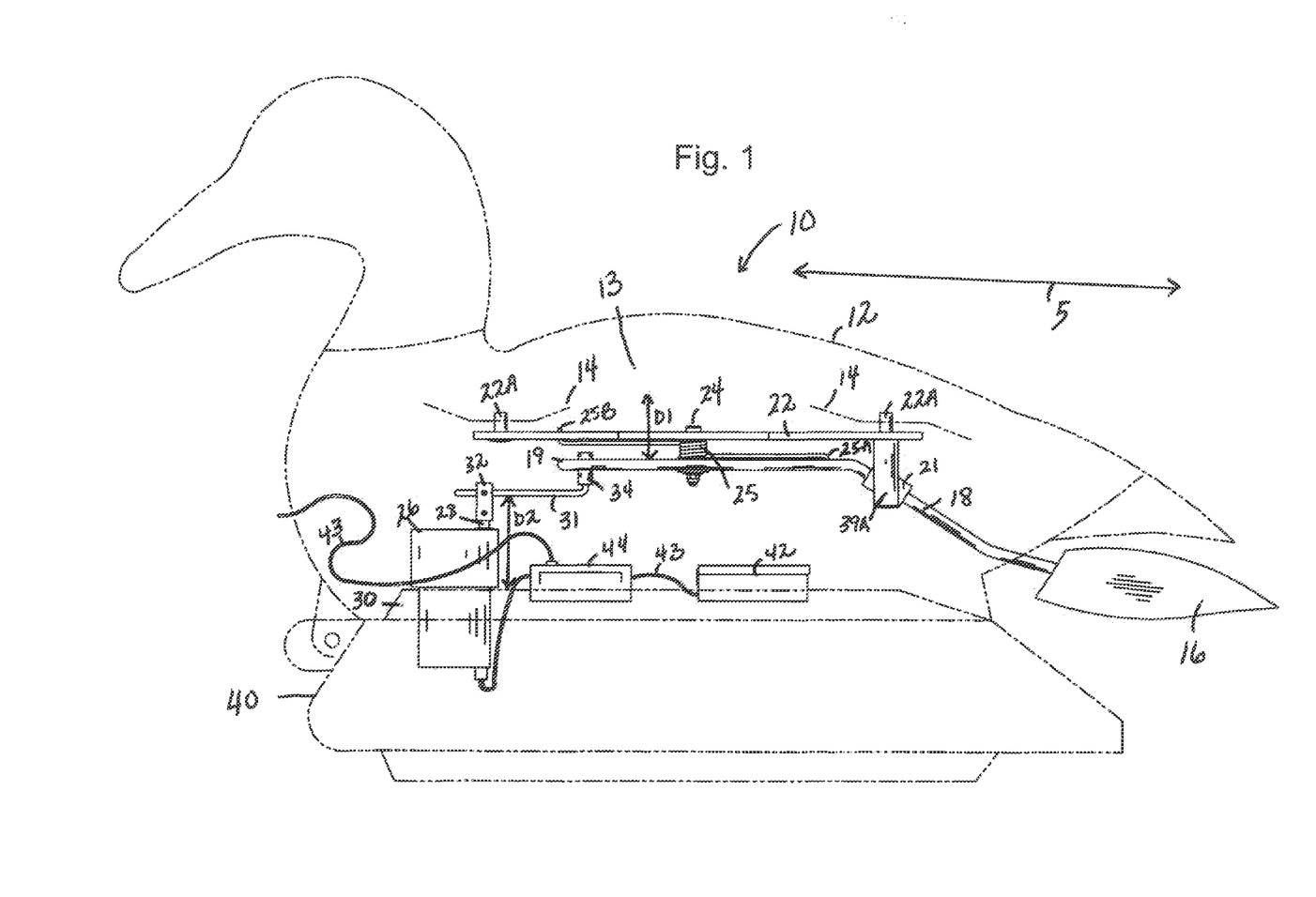
FIG. 1 is a side view of a preferred embodiment of the present invention, an animated duck decoy showing the moveable tail and tail driving mechanism disposed within the decoy body.
Figure 2:
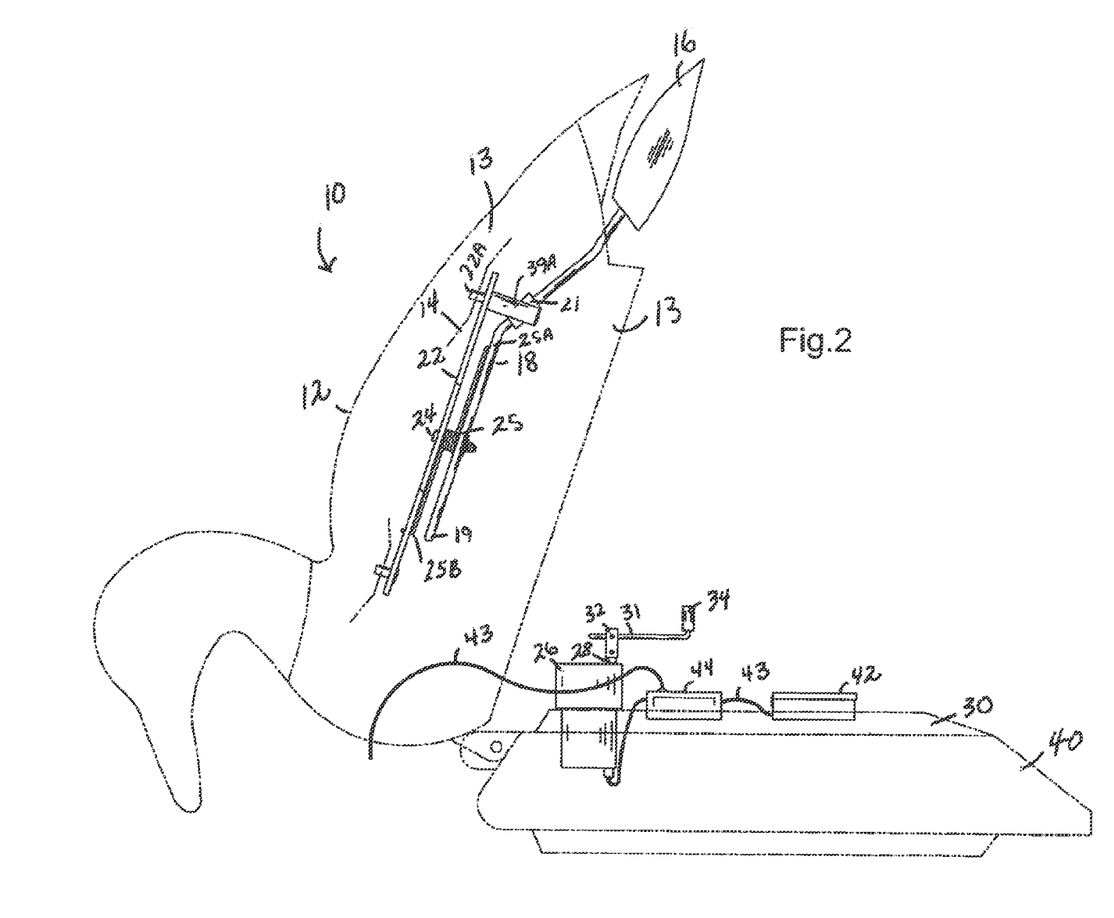
FIG. 2 is a side view of the animated duck decoy of FIG. 1, with the decoy body in an open position.

The interior chamber 13 includes an upper bracket 22 that is attached 22A to an upper surface 14 of the interior chamber 13. The fanned shaped tail 16 is connected to one distal end of a generally horizontal rod 18 while the opposite end of the rod is connected to and supported by a torsion spring 25, and further defines an open end 19. The torsion spring 25 encircles a pivot post 24 that downwardly extends from the upper bracket 22, and the torsion spring 25 is generally connected to the rod 18 and the upper surface of the interior chamber 13. More particularly, the torsion spring 25 includes a first attachment 27 to a preferably rubber ring 27A and has a first end 25A appropriately connected to the rod 18, and a second and opposite end 25B connected to the upper bracket 22. As best shown in FIG. 1, the rod 18, and importantly, the open end 19, is downwardly spaced a distance D1 from the upper surface 14 of the interior chamber 13, so, as will be discussed, be in communications with the lower mechanical portion.

Lower Mechanical Portion

The interior surface further includes a lower bracket 30 attached to the floatable base 40 and sandwiched between the floatable base 40 and the interior chamber 13. Alternatively, the lower bracket 30 can be integral to the floatable base 40.

Figure 3:
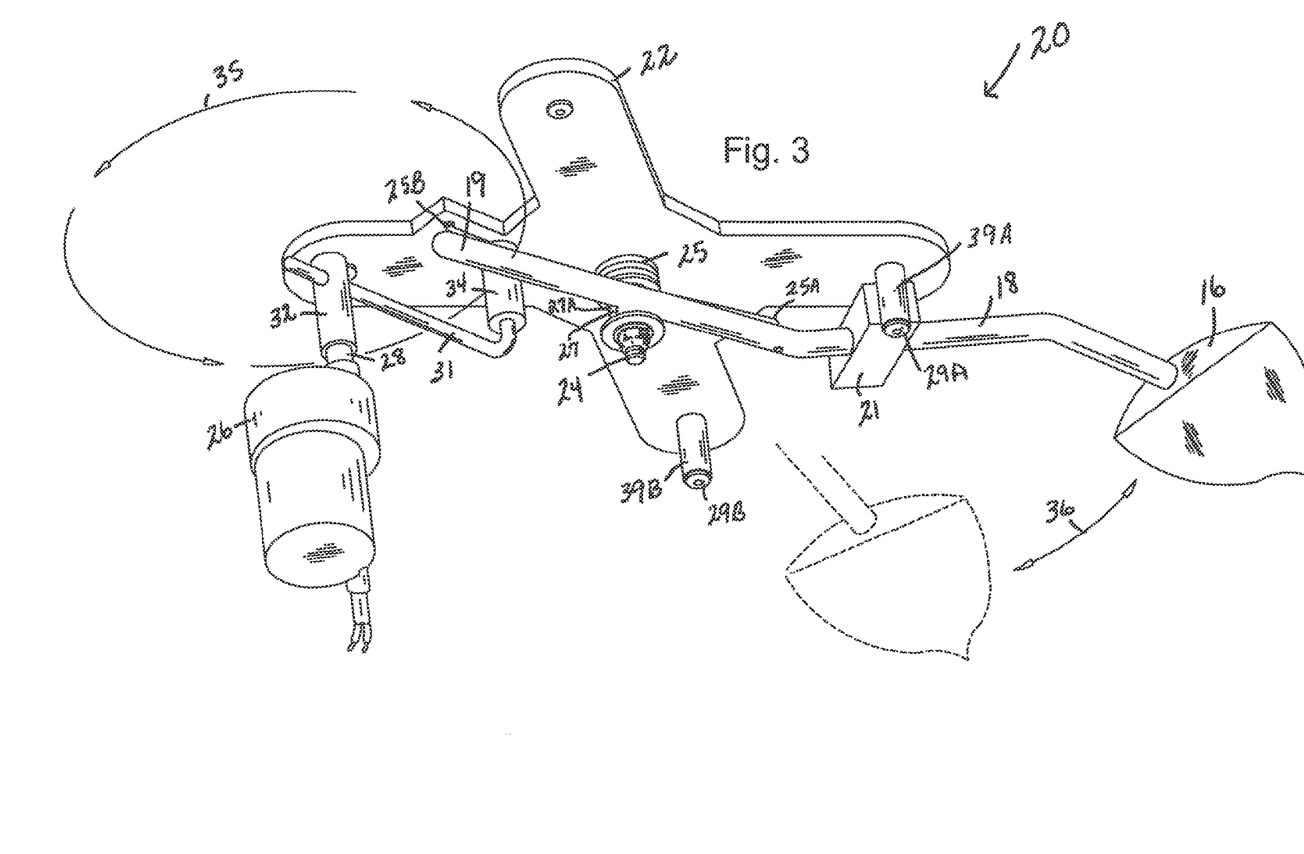
FIG. 3 is a perspective view of the tail driving mechanism of FIG. 1.
Figure 4:
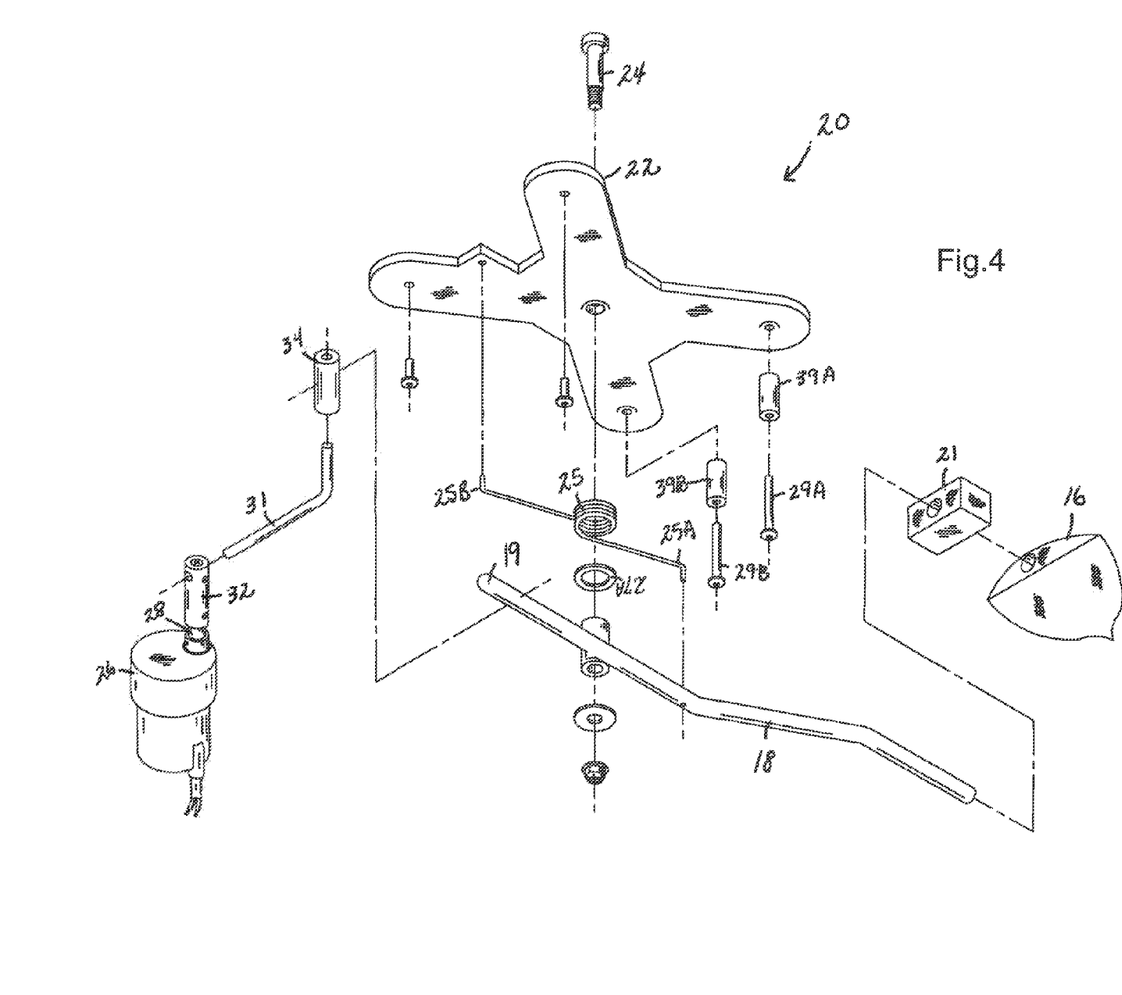
FIG. 4 is an exploded view of the tail driving mechanism of FIG. 1.

A rotating arm 31 is connected to a hub 32 which is, in turn, axially connected to a drive shaft 28 which is driven by a motor 26. The rotating arm 31 further includes an elastomeric bumper 34. Motor 26 is powered by a battery means 42 with wires 43 and switch 44. Thus, motor 26 causes the arm 31 to rotate in either a clockwise or counterclockwise direction in a horizontal plane 35 (see FIG. 3). As illustrated, the rotating arm 31, and importantly, the elastomeric bumper 34, is upwardly spaced a distance D2 from the lower bracket 30, and in communication with the upper mechanical portion. In particular, as the rotating arm 31 rotates on the horizontal plane 35 as described, the elastomeric bumper 34 strikes the open end 19 of rod 18 as the arm 31 rotates. When the bumper 34 strikes the rod 18, rod 18 is caused to rotate on torsion spring 25. This, in turn, causes rod 18 and thus the tail 16 to rotate through a horizontal arc 36 as well.

With the torsion spring 25 in an unstressed state, the rod 18 points approximately in parallel to a longitudinal axis 5. The torsion spring 25 thus tends to keep the rod 18 in a "home position" wherein rod 18 points generally in parallel to the longitudinal axis 5, as seen in FIG. 1. It can then be seen that as the bumper 34 strikes and then sweeps by the open end 19 of rod 18, the torsion spring 25 is subjected to twisting about its axis by sideways forces of the bumper 34 striking the open end 19 of the rod 18. Once the bumper striker 34 releases the open end 19, the torsion spring 25 will then cause the rod 18 to spring back towards and past the unstressed position, thus causing the rod 18 and the tail 16 to flick back and forth until the spring 25 causes the movement to cease. The speed and the number of "flicks" of the tail 16 are dependent upon friction and the spring constant or stiffness of the torsion spring 25.

As illustrated, two vertical stop posts 29A, 29B are positioned on each side of the swinging rod 18 and vertically extend downward from the upper bracket 22. The two vertical stop posts 29A, 29B, each include elastomeric bumpers 39A, 39B, and are located such that the angle which the rod 18 is allowed to swing is limited by the stop posts 29A, 29B, and bumpers 39A, 39B.

The rod 18 further contains an elastomeric bumper 21 positioned along the length of the rod 18 to strike the stop bumpers 39A, 39B, while the rod 18 is moving back and forth as described to further dampen the motion of the rod 18 at each end of the sweep arc 36. The combination of the torsion spring characteristics, the motor speed, the positioning of the rotating arm 31 within the hub 32, the position and length of the rod 18 and the elastomeric characteristics of the bumpers 21, 34, and 39A, 39B are balanced to provide movement of the tail 16 that closely mimics flicking of a duck's tail.

It is anticipated that the decoy base is made from a material which will cause the entire decoy to float with the upper and lower mechanical portions and the lower bracket 30 held above the water line. As illustrated, the lower portion of the decoy includes a floatable base 40 which preferably comprises a molded solid piece of Styrofoam.

It is further anticipated that the drive shaft 28 is driven by a gearhead motor in order to provide the required speed and torque.

Method of Operation

In application, the motorized rotating arm 31 contacts the horizontal rod 18 at the open end 19 causing it to displace along a selected distance of the arc 36. This displacement causes the rod 18 to swing in the opposite direction until the motorized striker arm 31 and horizontal rod 18 disengage. During the displacement, the torsion spring 25 is subjected to sideways forces and is accumulating potential energy. At the point of disengagement, the rod 18 including the tail 16 comes under the authority of the torsion spring 25 which has been displaced from the neutral or home position and follows the return motion of the spring 25. The corresponding "bounce" which is modulated by the dampeners 39A, 39B, produces an added effect "flicker". This action is repeated at certain intervals, and continues at the discretion of the user within allowable battery limits. The tail once struck resonances with multiple flicking movements of decreasing arc distance until it comes to a rest.

Figure 5:
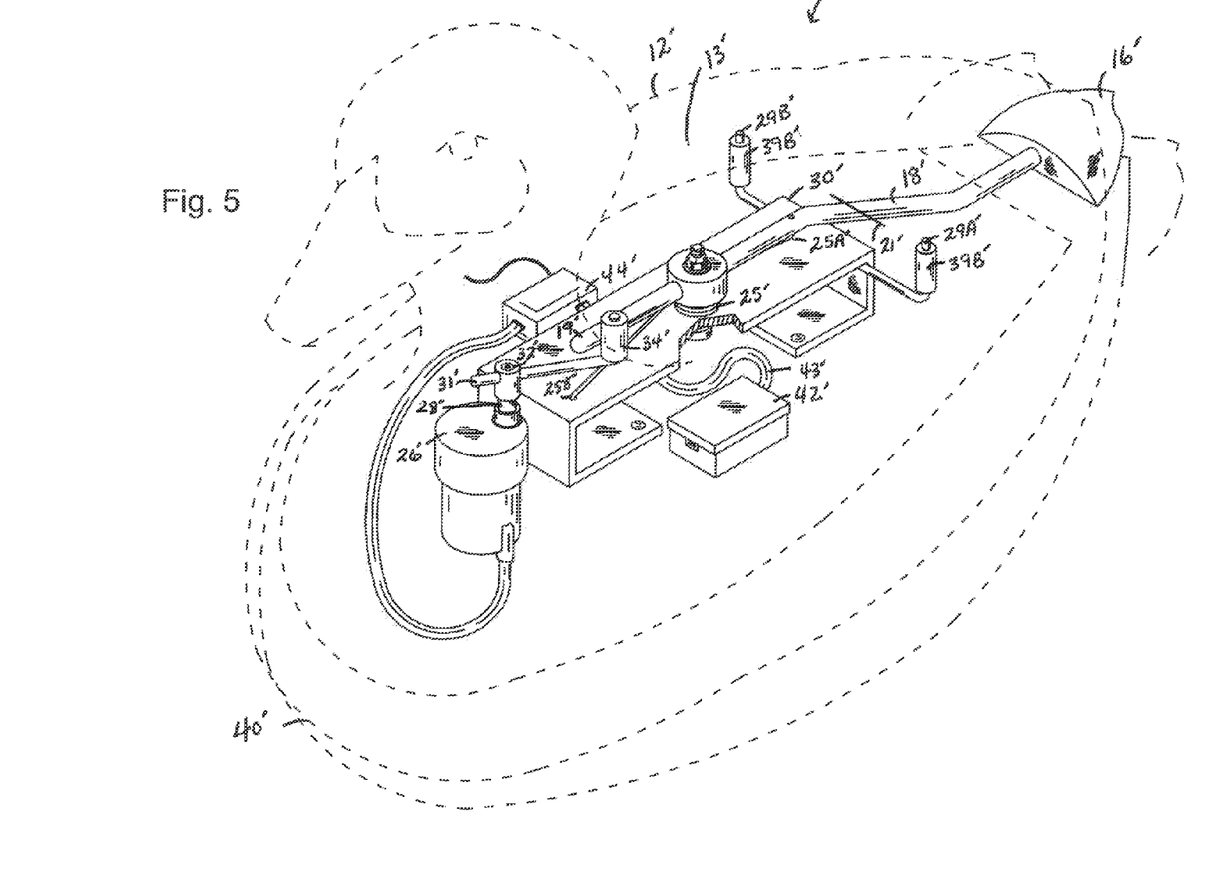
FIG. 5 is an alternate embodiment of the present invention, a side view of the animated duck decoy showing the moveable tail and tail driving mechanism disposed within the decoy body.
Figure 6:
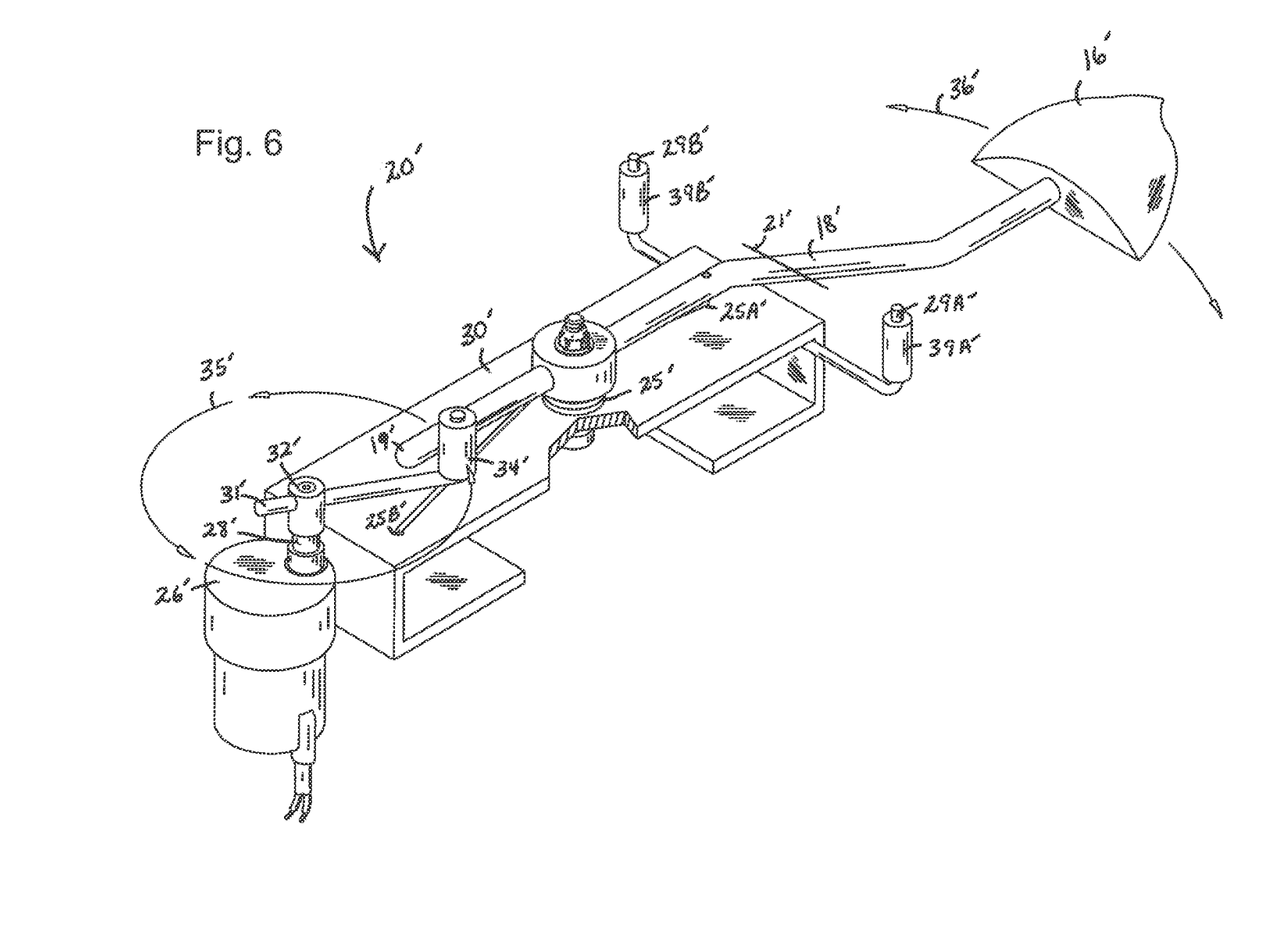
FIG. 6 is a perspective view of the tail driving mechanism of FIG. 5.

Referring now to FIGS. 5 and 6, there is disclosed an alternate embodiment of an animated duck decoy 10' as disclosed, the duck decoy 10' including all the embodiments of the preferred invention, including, a tail-wagging mechanism generally designated as 20', a hollow duck body shell 12' that defines an interior chamber 13', a floatable base 40', and a tail 16'.

The application of the animated duck decoy 10' is identical to the application of the duck decoy 10' disclosed in the preferred embodiment, however, the components of the preferred embodiment referred to as the upper mechanical portion, is disposed, in the alternate embodiment, on a lower bracket 30' attached to the floatable base 40' and sandwiched between the floatable base 40' and the interior chamber 13'. Alternatively, the lower bracket 30' can be integral to the floatable base 40'.

As illustrated, the fanned shaped tail 16' is connected to one distal end of a generally horizontal rod 18' while the opposite end of the rod is connected to and supported by a torsion spring 25' and further defined an open end 19'. The torsion spring 25' is generally connected to the rod 18' and the lower bracket 30'. More particularly, the torsion spring 25' has a first end 25A' appropriately connected to the rod 18', and a second and opposite end 25B' connected to the lower bracket 30'. As illustrated the rod 18', and importantly, the open end 19', is upwardly spaced a distance from the lower bracket 30', and in communication with a rotating arm 31'.

As illustrated, the rotating arm 31' is connected to a hub 32' which is, in turn, axially connected to a drive shaft 28' which is driven by a motor 26'. The rotating arm 31' further includes an elastomeric bumper 34'. Motor 26' is powered by a battery means 42' with wires 43' and switch 44'. Motor 26' causes the arm 31' to rotate in either a clockwise or counterclockwise direction in a horizontal plane 35'. As further illustrated, the rotating arm 31' and importantly, the elastomeric bumper 34', is upwardly spaced a distance from the lower bracket 30', and in communication with the open end 19' of the horizontal rod 18'.

The rotating arm 31' rotates on the horizontal plane 35', and the elastomeric bumper 34' strikes the open end 19' of rod 18' as the arm 31' rotates. When the bumper 34' strikes the rod 18', rod 18' is caused to rotate on torsion spring 25'. This, in turn, causes rod 18' and thus the tail 16' to rotate through a horizontal arc 36'.

It should be understood that as the bumper 34' strikes and then sweeps by the open end 19' of rod 18', the torsion spring 25' is subjected to twisting about its axis by sideways forces as the bumper 34' striking the open end 19' of the rod 18'. Once the bumper striker 34' releases the open end 19', torsion spring 25' will then cause the rod 18' to spring back towards and past the unstressed position, thus causing the rod 18' and the tail 16' to flick back and forth until the spring 25' causes the movement to cease. The speed and the number of "flicks" of the tail 16' are dependent upon friction and the spring constant or stiffness of the torsion spring 25'.

Two vertical stop posts 29A', 29B', are positioned on each side of the swinging rod 18' and vertically extend upward from the bracket 30'. The two vertical stop posts, 29A', 29B', each include elastomeric bumpers 39A', 39B', and are located such that the angle which the rod 18' is allowed to swing is limited by the stop posts 29A', 29B', and bumpers 39A', 39B'.

The rod 18 further contains an elastomeric bumper 21' positioned along the length of the rod 18' to strike the stop bumpers 39A', 39B', while the rod is moving back and forth as described.

The foregoing detailed description is given primarily for clearness of understanding and no unnecessary limitations are to be understood therefrom, for modification will become obvious skilled in the art upon reading this disclosure and be made upon departing from the spirit of the invention and scope of the appended claims. Accordingly, this invention is not intended to be limited by the specific exemplification presented herein above. Rather, what is intended to be covered is within the spirit and scope of the appended claims.

We claim:

1. A duck decoy comprising:
a decoy base,
a duck body shell removably connected to said decoy base, said duck body shell defining an interior chamber,
an upper mechanical portion and a lower mechanical portion,
said upper mechanical portion including an upper bracket attached to an upper surface of said interior chamber, a simulated tail member connected to a distal end of a horizontal rod that outwardly extends from a rear portion of said duck body shell, and an opposite end of said rod connected to a first end of a torsion spring, said torsion spring having a second end connected to said upper bracket, said opposite end of said horizontal rod further defining an open end, and wherein said open end is downwardly spaced a distance from said upper surface of the interior chamber,
said lower mechanical portion including a lower bracket attached to a top surface of said decoy base, said lower bracket having a motor attached thereto, said motor having a drive shaft extending vertically upward therefrom, said drive shaft having a hub rigidly fixed at the top end thereof,
said hub having a horizontal arm extending therefrom, said horizontal arm having a first elastomeric bumper affixed at one end thereto, wherein said horizontal arm is upwardly spaced from said lower bracket, and a spacing is between said horizontal rod and an entire length of said horizontal arm, and wherein said horizontal arm and said horizontal rod are each substantially parallel to a longitudinal axis, and wherein said motor rotates said arm in a circular direction such that said first bumper is configured to strike said open end of said horizontal rod causing the horizontal rod to rotate horizontally and causing the tail member to rotate horizontally.

2. The duck decoy as recited in claim 1, wherein said horizontal arm rotates on a horizontal plane.

3. The duck decoy as recited in claim 2, wherein said upper mechanical portion further including first and second vertical stop posts positioned on each side of said horizontal rod and vertically extending downward from said upper bracket.

4. The duck decoy as recited in claim 3, wherein said first vertical stop post includes a second elastomeric bumper, and said second vertical stop post includes a third elastomeric bumper.

5. The duck decoy as recited in claim 4, wherein a fourth elastomeric bumper is positioned along the length of said horizontal rod and is configured to communicate with said second and third elastomeric bumpers.

6. The duck decoy as recited in claim 1, wherein said torsion spring encircles a pivot post that downwardly extends from said upper bracket.

7. A duck decoy comprising:
a decoy base,
a duck body shell removably connected to said decoy base, said duck body she defining an interior chamber,
said interior chamber including a simulated tail member that outwardly extends from a rear portion of said duck body shell, said tail member is connected to a distal end of a horizontal rod and an opposite end of said rod is connected to a first end of a torsion spring, said torsion spring having a second end connected to a first bracket, said opposite end of said horizontal rod further defining an open end,
a motor having a drive shaft extending vertically upward from a second bracket, said drive shaft having a hub rigidly fixed at the top end thereof,
said hub having a horizontal arm extending therefrom, said horizontal arm having a first elastomeric bumper affixed at one end thereto, wherein said horizontal arm and said horizontal rod extend parallel to each other and substantially parallel to a longitudinal axis and a spacing is between said horizontal rod and an entire length of said horizontal arm, and wherein said motor rotates said arm in a circular direction such that said first bumper is configured to strike said open end of said horizontal rod causing the horizontal rod to rotate horizontally and causing the tail member to rotate horizontally.

8. The duck decoy as recited in claim 7, wherein said first bracket and said second bracket are attached to a top surface of said decoy base.

9. The duck decoy as recited in claim 7, wherein said horizontal arm rotates on a horizontal plane.

10. The duck decoy as recited in claim 9, further including first and second vertical stop posts positioned on each side of said horizontal rod and vertically extending from said first bracket.

11. The duck decoy as recited in claim 10, wherein said first vertical stop post includes a second elastomeric bumper, and said second vertical stop post includes a third elastomeric bumper.

12. The duck decoy as recited in claim 11, wherein a fourth elastomeric bumper is positioned along the length of said horizontal rod and is configured to communicate with said second and third elastomeric bumpers when said horizontal rod is rotating horizontally.

13. The duck decoy as recited in claim 7, wherein said torsion spring encircles a pivot post that vertically extends from said first bracket.

14. A duck decoy comprising:
a decoy base,
a duck body shell removably connected to said decoy base, said duck body she defining an interior chamber,
an upper mechanical portion and a lower mechanical portion,
said upper mechanical portion including an upper bracket attached to an upper surface of said interior chamber, a simulated tail member connected to a distal end of a horizontal rod that outwardly extends from a rear portion of said duck body shell, and an opposite end of said rod connected to a torsion spring, wherein said torsion spring encircles a pivot post that downwardly extends from said upper bracket, said opposite end of said horizontal rod further defining an open end, and wherein said open end is downwardly spaced a distance from said upper surface of the interior chamber,
said lower mechanical portion including a lower bracket attached to a top surface of said decoy base, said lower bracket having a motor attached thereto, said motor having a drive shaft extending vertically upward therefrom, said drive shaft having a hub rigidly fixed at the top end thereof,
said hub having a horizontal arm extending therefrom, said horizontal arm having a first elastomeric bumper affixed at one end thereto, wherein said horizontal arm and said horizontal rod are each substantially parallel to a longitudinal axis with a spacing between said horizontal rod and an entire length of said horizontal arm, and when said motor rotates said arm in a circular direction, said first bumper strikes said open end of said horizontal rod, causing the horizontal rod to rotate horizontally and causing the tail member to rotate horizontally.

15. The duck decoy as recited in claim 14, wherein said horizontal arm rotates on a horizontal plane.

16. The duck decoy as recited in claim 15, wherein said upper mechanical portion further including first and second vertical stop posts positioned on each side of said horizontal rod and vertically extending downward from said upper bracket.

17. The duck decoy as recited in claim 16, wherein said first vertical stop post includes a second elastomeric bumper, and said second vertical stop post includes a third elastomeric bumper.

18. The duck decoy as recited in claim 17, wherein a fourth elastomeric bumper is positioned along the length of said horizontal rod and is configured to communicate with said second and third elastomeric bumpers when said horizontal rod is rotating horizontally.

19. The duck decoy as recited in claim 14, wherein said decoy base is constructed of a buoyant material.

20. The duck decoy as recited in claim 14, wherein said drive shaft is driven by a gearhead motor.

* * * * *